(12) United States Patent
Kudo et al.

(10) Patent No.: US 6,828,706 B2
(45) Date of Patent: Dec. 7, 2004

(54) WATERTIGHT BRUSHLESS FAN MOTOR

(75) Inventors: Naruhiko Kudo, Nagano (JP); Kakuhiko Hata, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 10/759,588

(22) Filed: Jan. 16, 2004

(65) Prior Publication Data

US 2004/0145250 A1 Jul. 29, 2004

(30) Foreign Application Priority Data

Jan. 17, 2003 (JP) .................................... 2003-010446

(51) Int. Cl.[7] .......................... H02K 5/02; H02K 5/132; H02K 5/26
(52) U.S. Cl. .............................. 310/87; 310/43; 310/45
(58) Field of Search ............................... 310/87, 43, 45; 428/390, 387, 378, 379, 391; 257/787, 737, 788, 790; 252/500; 174/260

(56) References Cited

U.S. PATENT DOCUMENTS

| 4,735,858 A | * | 4/1988 | Hosokawa et al. | ......... 428/390 |
| 6,133,661 A | * | 10/2000 | Okawa et al. | ................. 310/90 |
| 6,660,943 B1 | * | 12/2003 | Gotoh et al. | ................. 174/260 |
| 2002/0158232 A1 | * | 10/2002 | Mitani et al. | ............... 252/500 |

FOREIGN PATENT DOCUMENTS

| JP | 7-335800 | 12/1995 |
| JP | 10191611 | 7/1998 |

* cited by examiner

*Primary Examiner*—Tran Nguyen
(74) *Attorney, Agent, or Firm*—Rankin, Hill, Porter & Clark LLP

(57) ABSTRACT

A molded part is formed of an insulating resin such that a stator, electronic components, and a circuit substrate are included inside the molded part. A protective layer for preventing breakage of electrical connection that might occur due to expansion or shrinkage of the molded part is provided at least between the electronic components and the molded part. The protective layer is formed of an insulating material having shear adhesion strength smaller than that of an insulating resin of the molded part that has been cured. The shear adhesion strength and the thickness of the protective layer are defined so that, when the expansion or shrinkage which might cause the breakage of the electrical connection has taken place in the insulating resin of the molded part, separation between the electronic components and the protective layer can be caused.

14 Claims, 1 Drawing Sheet

WATERTIGHT BRUSHLESS FAN MOTOR

BACKGROUND OF THE INVENTION

The present invention relates to a watertight brushless fan motor.

Generally, the brushless fan motor includes a stator, a circuit substrate fixed to the stator, one or more electronic components mounted on the circuit substrate, and a rotor provided with a plurality of blades. In the brushless fan motor of this type, waterproofing of the stator, circuit substrate, and the like is demanded. As shown in Japanese Patent Application Laid-Open Publication No. 191611/1998, a watertight brushless fan motor was proposed in which a molded part was formed by molding with an insulating resin in such a manner that the electronic components and the circuit substrate are included therein. However, the molded part thus formed might expand or shrink, thereby damaging the electronic components and the circuit substrate. Actually, a protective layer, which alleviates the expansion or shrinkage of the molded part to prevent damage to the circuit substrate, is provided between the molded part and the circuit substrate with the electronic components mounted thereon. Among such prior arts is the one shown in Japanese Patent Application Laid-Open Publication No. 335800/1995, which is not applied to the motor, though.

Recently, an insulating resin having high adhesion strength such as urethane has become employed for the molded part so as to shorten its curing time and obtain a waterproofing effect at low cost. However, the molded part described above becomes more adhered to the electronic components. Thus, when the molded part has expanded or shrunk due to a change in temperature, the molded part acts to pull off the electronic components from the circuit substrate. Consequently, electrical connection between the electronic components and circuits on the circuit substrate might be broken. Further, when the molded part described above was formed, the breakage of electrical connection between the electronic components and the circuits on the circuit substrate could not be prevented merely by providing the conventional protective layer between the circuit substrate and the molded part.

SUMMARY OF THE INVENTION

The prevent invention has been made to solve the problems described above. It is therefore an object of the present invention to provide a watertight brushless fan motor that can prevent breakage of electrical connection between electronic components and circuits on a circuit substrate, caused by a molded part.

Another object of the invention is to provide a watertight brushless fan motor that can prevent the molded part from coming into contact with a rotor when the molded part has expanded.

A watertight brushless fan motor to which the present invention aims at improvement includes a circuit substrate fixed to a stator, one or more electronic components mounted on the circuit substrate, a rotor including a plurality of blades, and a molded part formed of an insulating resin in such a manner that the stator, the one or more electronic components, and the circuit substrate are included therein.

The molded part, when having been formed to directly cover the electronic components and the circuit substrate and expanding or shrinking due to a change in temperature, expands or shrinks to such an extent that electrical connection between the electronic components and circuits on the circuit substrate might be broken. In the present invention, the watertight brushless fan motor further includes a protective layer provided at least between the one or more electronic components and the molded part, for preventing the breakage of electrical connection that might occur due to the expansion or shrinkage of the molded part. Then, shear adhesion strength and thickness of the protective layer are defined so that, when the expansion or shrinkage that might cause the breakage of electrical connection has occurred, separation between the one or more electronic components and the protective layer can be caused.

More specifically, a watertight brushless fan motor to which the present invention aims at improvement includes a stator having a plurality of stator magnetic poles and comprising an iron core having a plurality of projecting pole portions and a winding wound around each projecting pole portion of the iron core. The iron core is constituted from a plurality of laminated steel plates.

The watertight brushless fan motor further comprises: a circuit substrate fixed to the stator with a predetermined space provided between the circuit substrate and the projecting pole portions; one or more electronic components mounted on the circuit substrate so as to constitute a control circuit for controlling current flowing through the windings; a rotor including a plurality of rotor magnetic poles, each of which is made of a permanent magnet, on an inner peripheral side thereof and including a plurality of blades on an outer peripheral side thereof; a case; and a molded part.

The case includes an inner cylindrical section, a plate-like section, and an outer cylindrical section. The inner cylindrical section includes bearing for rotatably supporting the rotary shaft of the rotor. The plate-like section extends from an end of the inner cylindrical section in a direction perpendicular to the center line of the inner cylindrical section with a predetermined space provided between the plate-like section and the circuit substrate. The outer cylindrical section extends in the axial line direction of the rotary shaft from an outer end of the plate-like section, along the inner cylindrical section. In the present invention, a protective layer is formed of an insulating material having shear adhesion strength smaller than the sear adhesion strength of the insulating resin that has been cured, and the shear adhesion strength and the thickness of the protective layer are defined so that, when the expansion or shrinkage that might cause the breakage of electrical connection has occurred, separation between the one or more electronic components and the protective layer can be caused. For example, when the insulating resin for forming the molded part, which has been cured, has a shear adhesion strength of 30 kfg/cm$^2$ or more, the insulating material that forms the protective layer having a shear adhesion strength of 15 kgf/cm$^2$ or less should be employed, and the protective layer should have a thickness in the range of 10 $\mu$m to 50 $\mu$m. The "shear adhesion strength" herein refers to the strength under which joined surfaces break away by applying a shear stress to the joined surfaces, as defined in the JIS-K6800.

When the shear adhesion strength and the thickness of the protective layer are defined as in the present invention, separation between the one or more electronic components and the protective layer occurs even if the molded part has expanded or shrunken due to a change in temperature. Thus, separation of the electronic components from the circuit substrate due to the expansion or shrinkage of the molded part can be prevented. For this reason, the breakage of electrical connection between the electronic components and the circuits on the circuit substrate can be prevented.

Preferably, the protective layer is formed so as to cover the entire surface of the circuit substrate including the one or more electronic components. With this arrangement, the protective layer can be easily formed by spraying over the entire surface of the circuit substrate with the electronic components mounted thereon.

Various materials can be employed as the insulating resin for forming the molded part and the protective layer. If the insulating resin for forming the molded part is made of an urethane resin, for example, a silicon resin can be employed for the protective layer.

In a watertight brushless fan motor according to another aspect of the present invention, at least one concave portion is provided in a portion of the surface of the molded part that faces the rotor, so as to be open toward the rotor and to receive expansion of the molded part in order to prevent contact of the molded part with the rotor when the molded part has expanded. When at least one concave portion is formed in the molded part in this manner, the expansion of the molded part is received by the concave portion, even if the molded part has expanded due to a change in temperature. Thus, contact of the molded part with the rotor is prevented.

Notably, there are not many electronic components inside the outer cylindrical portion. Accordingly, the thickness of the molded part inside the outer cylindrical portion increases. For this reason, the concave portion is preferably formed of an annular groove formed to be adjacent to and run along the outer cylindrical section.

As a matter of course, the watertight brushless fan motor can be configured to have both the concave portion thus formed and the protective layer described above.

According to the present invention, when the molded part has expanded or shrunken due to a change in temperature, separation between the one or more electronic components and the protective layer occurs. Thus, separation of the electronic components from the circuit substrate due to the molded part can be prevented. For this reason, the breakage of electrical connection between the electronic components and the circuits on the circuit substrate can be prevented.

According to the present invention, at least one concave portion is formed in the molded part. Thus, even if the molded part has expanded due to a change in temperature, the expansion of the molded part is received by the concave portion, so that contact of the molded part with the rotor is prevented.

BRIEF DESCRIPTION OF THE DRAWING

These and other objects and many of the attendant advantages of the present invention will be readily appreciated as the same becomes better understood by reference to the following detailed description when considered in connection with the accompanying drawing.

DETAILED DESCRIPTION OF PREFERRED EMBODIMENT

Figure 1:
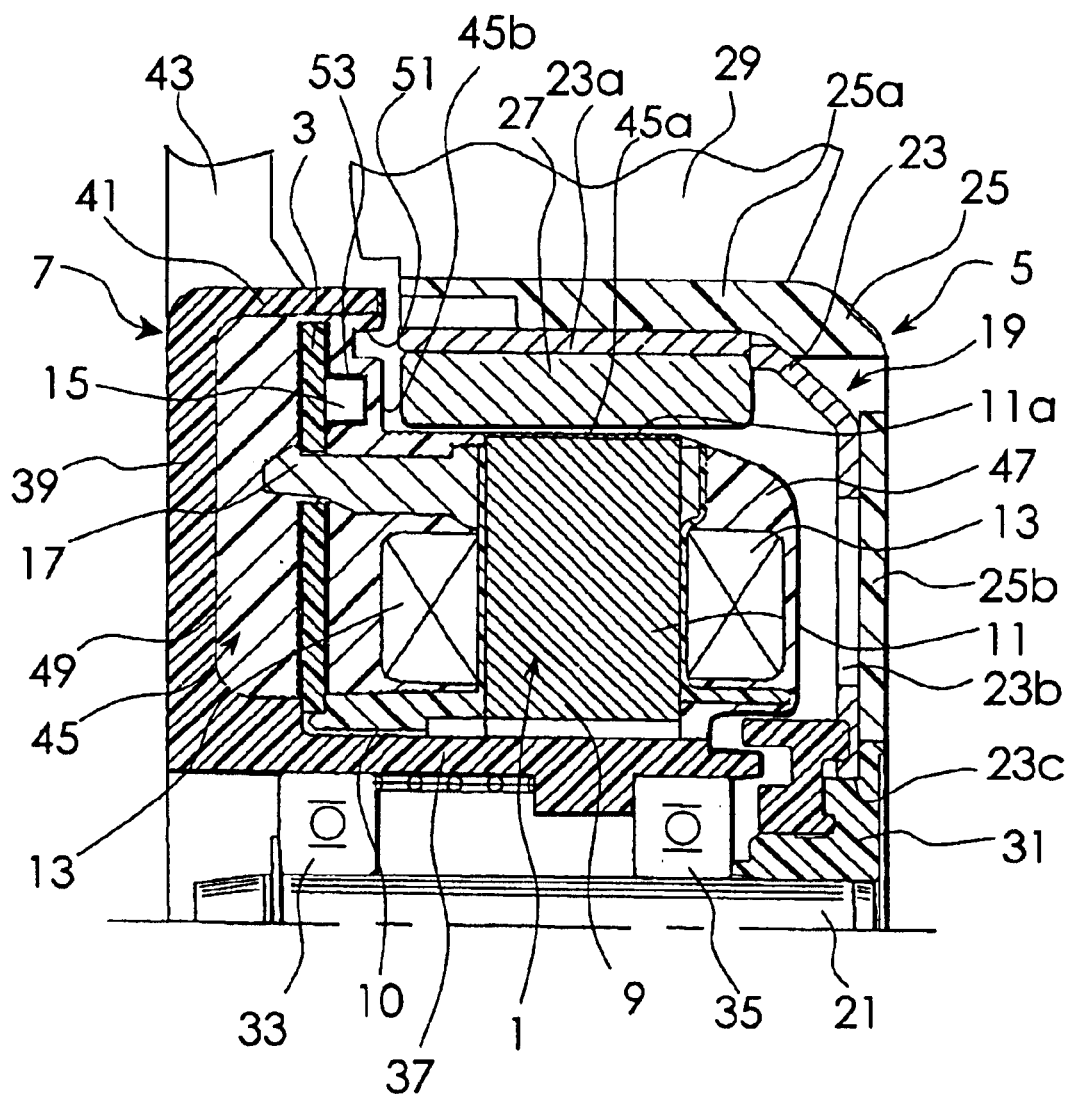
FIG. 1 is a vertical cross sectional view of a main part of a watertight brushless fan motor according to an embodiment of the present invention.

Now, an embodiment of the present invention will be described in detail with reference to accompanied drawing. FIG. 1 is a vertical cross sectional view of a main part (half portion) of a watertight brushless fan motor according to the embodiment of the present invention. As shown in FIG. 1, the watertight brushless fan motor in this embodiment includes a stator 1, a circuit substrate 3, a rotor 5, and a case 7. The stator 1 includes an iron core 9 constituted from a plurality of laminated steel plates. The iron core 9 has a plurality of projecting pole portions 11 arranged in a circumferential direction. A winding 13 is wound around each of the projecting pole portions 11 of the iron core 9 through an insulator 10 formed of an insulating resin. These projecting portions 11 function as stator magnetic poles when the wirings 13 are excited. Accordingly, the tip end surface of each of the projecting portions 11 becomes a pole face 11a of the stator magnetic pole.

The circuit substrate 3 is fixed to an end of the insulator 10 for the stator 1. One or more electronic components 15 for controlling current flowing through the windings 13 are mounted on the surface of the circuit substrate 3 facing the projecting portions 11. As the lead wire of the winding 13 is wound around a terminal pin 17 which is passed through the through-hole of the circuit substrate 3 and soldered to an electrode on the circuit substrate 3, the control circuit on the circuit substrate 3 is electrically connected to the winding 13.

The rotor 5 includes a rotor side case 19 and a rotary shaft 21. The rotor side case 19 is constituted from a cup member 23 made of a magnetic material and a blade mounting hub 25 fitted on the outside of the cup member 23. The cup member 23 is constituted from a cylindrical section 23a and a bottom wall section 23b that is integral with the cylindrical section 23a. The cylindrical section 23a has a plurality of rotor magnetic poles 27, each of which is made of a permanent magnet, fixed to the inner peripheral portion of the cylindrical section 23a so that the rotor magnetic poles 27 are arranged in the circumferential direction. The bottom wall section 23b blocks one end of the cylindrical section 23a. At the center of the bottom wall section 23b is formed a through-hole 23c in which a bush 31 is to be fitted. The blade mounting hub 25 is constituted from a cylindrical section 25a and a bottom wall section 25b that is integral with the cylindrical section 25a. The cylindrical section 25a has a plurality of blades 29 fixed to an outer peripheral portion thereof. The bottom wall section 25b blocks one end of the cylindrical section 25a. To the center of the bottom wall section 25b is fixed the bush 31 for securing the rotor side case 19 to the rotary shaft 21.

The case 7 includes an inner cylindrical section 37 for supporting bearings, a plate-like section 39, an outer cylindrical section 41, a cylindrical housing section not shown, and a plurality of webs 43. The inner cylindrical section 37 receives two ball bearings 33 and 35 for rotatably supporting the rotary shaft 21 of the rotor 5 in its inside. The plate-like section 39 is coupled to the inner cylindrical section 37. The outer cylindrical section 41 extends in the axial direction of the rotary shaft 21 from an outer end of the plate-like section 39, along the inner cylindrical section 37. The cylindrical housing section surrounds an outer peripheral portion of the plurality of blades 29 of the rotor 5. The plurality of webs 43 couple the plate-like section 39 and the outer cylindrical section 41 to the housing section. The case 7 is integrally molded with a resin. The plate-like section 39 extends from an end of the inner cylindrical section 37 in a direction perpendicular to the center line of the inner cylindrical section 37 with a predetermined space formed between the plate-like section 39 and the circuit substrate 3. The plurality of webs 43 are arranged at intervals in the circumferential direction, and in one web of the plurality of webs 43 is formed a lead wire receiving groove for receiving a plurality of lead wires connected to the control circuit of the circuit substrate 3 and for guiding them to the side of the housing section.

A molded part 45 is formed on the inner cylindrical section 37. The molded part 45 is injection molded with an insulating resin made of an urethane resin in such a manner that the stator 1, electronic components 15, and circuit substrate 3 are included in its inside. The molded part 45 has a shear adhesion strength of 30 kgf/cm² or more. Thus, if the molded part 45 is formed to directly cover the electronic components 15 and the circuit substrate 3 and has expanded or shrunken due to a change in temperature, the expansion or shrinkage is such that the electronic components 15 might be pulled off from the circuit substrate 3, so that electrical connection between the electronic components 15 and circuits on the circuit substrate 3 might be broken. The molded part 45 is constituted from a first molded part 47 that mainly includes the stator 1 and a second molded part 49 that mainly includes the circuit substrate 3. The first molded part 47 has a first opposed surface 45*a* facing the rotor magnetic poles 27 of the rotor 5, while the second molded part 49 has a second opposed surface 45*b* facing the rotor side case 19 and an end of the rotor magnetic poles 27 of the rotor 5.

In the second opposed surface 45*b*, a concave portion 51 is formed so as to be open towards the side of the rotor 5. The concave portion 51 is constituted from an annular groove formed so as to be adjacent to and run along the outer cylindrical section 41 of the case 7 and to have a rectangular cross section. The concave portion 51 has a shape and dimensions that receive expansion of the molded part 45 in order to prevent the molded part 45 from coming into contact with the rotor 5 when the molded part 45 has expanded. In this embodiment, a distance between the center of the concave portion 51 and the inside peripheral surface of the outer cylindrical section 41 is defined in the range of 2 mm to 5 mm. The concave portion 51 has a width in the range of 1 mm to 2 mm, and a depth in the range of 1 mm to 2.5 mm. The concave portion 51 may also be formed to be directly adjacent to the inside peripheral surface of the outer cylindrical section 41 so that the inner peripheral surface of the outer cylindrical section 41 is exposed, with no space provided from the inside of the outer cylindrical section 41. The electronic components 15 and the circuit substrate 3 are disposed at locations at predetermined distances from the concave portion 51 so that even if the concave portion 51 is formed, the molded part 45 with a sufficient thickness can be formed so as to achieve waterproofing of the electronic components 15 and the circuit substrate 3.

A protective layer 53 made of a silicon resin is formed between the entire surfaces of the circuit substrate 3 including the electronic components 15 and the molded part 45. The shear adhesion strength and the thickness of the protective layer 53 are defined so that separation between the electronic components 15 and the protective layer 53 can occur when the expansion or shrinkage that might cause the breakage of electrical connection, which was described before, has occurred. In this embodiment, the protective layer 53 has a shear adhesion strength of 15 kgf/cm² or less and a thickness in the range of 10 μm to 50 μm. The protective layer 53 was formed by spraying the silicon resin dissolved in a solvent onto the entire surfaces of the circuit substrate 3 including the electronic components 15. The protective layer 53 may also be formed by brush coating, potting, or the like. In the watertight brushless fan motor in this embodiment, even if the molded part 45 has expanded or shrunken due to a change in temperature, separation between the electronic components 15 and the protective layer 53 occurs. Thus, separation of the electronic components 15 from the circuit substrate 3 due to the molded part 45 can be prevented. For this reason, the breakage of electrical connection between the electronic components 15 and the circuits on the circuit substrate 3 can be prevented.

Further, the present invention is not limited to this embodiment, but various variations and modifications may be made without departing from the scope of the present invention.

What is claimed is:

1. A watertight brushless fan motor comprising:

a circuit substrate fixed to a stator;

one or more electronic components mounted on the circuit substrate;

a rotor including a plurality of blades; and a molded part formed of an insulating resin in such a manner that the stator, the one or more electronic components, and the circuit substrate are included therein;

the molded part expanding or shrinking to such an extent that electrical connection between the electronic components and circuits on the circuit substrate might be broken as it expands or shrinks due to a change in temperature, on an assumption that the molded part has been formed to directly cover the electronic components and the circuit substrate;

wherein the watertight brushless fan motor further comprises:

a protective layer provided at least between the one or more electronic components and the molded part, for preventing the breakage of electrical connection that might occur due to the expansion or shrinkage of the molded part; and shear adhesion strength and thickness of the protective layer are defined so that, when the expansion or shrinkage that might cause the breakage of electrical connection has occurred, separation between the one or more electronic components and the protective layer can be caused.

2. The watertight brushless fan motor according to claim 1, wherein the protective layer is formed to cover an entire surface of the circuit substrate including the one or more electronic components.

3. The watertight brushless fan motor according to claim 1, wherein the insulating resin for forming the molded part, which has been cured, has a shear adhesion strength of 30 kgf/cm² or more;

the protective layer is formed of an insulating material which has a shear adhesion strength of 15 kgf/cm² or less; and the protective layer has a thickness in the range of 10 μm to 50 μm.

4. The watertight brushless fan motor according to claim 3, wherein the insulating resin for forming the molded part is made of an urethane resin; and the protective layer is formed of a silicon resin.

5. The watertight brushless fan motor according to claim 1, wherein, in a portion of a surface of the molded part that faces the rotor, at least one concave portion is provided so as to be open toward the rotor and to receive the expansion of the molded part in order to prevent contact of the molded part with the rotor when the molded part has expanded.

6. A watertight brushless fan motor comprising:

a stator having a plurality of stator magnetic poles and comprising an iron core having a plurality of projecting pole portions and a winding wound around each projecting pole portion of the iron core;

the iron core being constituted from a plurality of laminated steel plates;

a circuit substrate fixed to the stator with a predetermined space provided between the circuit substrate and the projecting pole portions;

one or more electronic components mounted on the circuit substrate so as to constitute a control circuit for controlling current flowing through the windings;

a rotor including a plurality of rotor magnetic poles, each of which is made of a permanent magnet, on an inner peripheral side thereof and including a plurality of blades on an outer peripheral side thereof;

a case comprising an inner cylindrical section, a plate-like section, and an outer cylindrical section, the inner cylindrical section including bearing for rotatably supporting a rotary shaft of the rotor;

the plate-like section extending from an end of the inner cylindrical section in a direction perpendicular to a center line of the inner cylindrical section with a predetermined space provided between the plate-like section and the circuit substrate;

the outer cylindrical section extending in an axial line direction of the rotary shaft from an outer end of the plate-like section, along the inner cylindrical section; and a molded part formed with an insulating resin in such a manner that the stator, the one or more electronic components, and the circuit substrate are included therein;

the molded part expanding or shrinking to such an extent that electrical connection between the electronic components and circuits on the circuit substrate might be broken as it expands or shrinks due to a change in temperature, on an assumption that the molded part has been formed to directly cover the electronic components and the circuit substrate;

wherein the watertight brushless fan motor further comprises:

a protective layer provided at least between the one or more electronic components and the molded part, for preventing the breakage of electrical connection that might occur due to the expansion or shrinkage of the molded part;

the protective layer is formed of an insulating material having shear adhesion strength smaller than shear adhesion strength of the insulating resin that has been cured; and the shear adhesion strength and thickness of the protective layer are defined so that, when the expansion or shrinkage that might cause the breakage of electrical connection has occurred, separation between the one or more electronic components and the protective layer can be caused.

7. The watertight brushless fan motor according to claim 6, wherein the protective layer is formed to cover an entire surface of the circuit substrate including the one or more electronic components.

8. The watertight brushless fan motor according to claim 6, wherein the insulating resin for forming the molded part, which has been cured, has a shear adhesion strength of 30 kgf/cm$^2$ or more;

the insulating material for forming the protective layer has a shear adhesion strength of 15 kgf/cm$^2$ or less; and the protective layer has a thickness in the range of 10 $\mu$m to 50 $\mu$m.

9. The watertight brushless fan motor according to claim 8, wherein the insulating resin for forming the molded part is made of an urethane resin; and the protective layer is formed of a silicon resin.

10. The watertight brushless fan motor according to claim 6, wherein, in a portion of a surface of the molded part that faces the rotor, at least one concave portion is provided so as to be open toward the rotor and to receive the expansion of the molded part in order to prevent contact of the molded part with the rotor when the molded part has expanded.

11. A watertight brushless fan motor comprising:

a stator having a plurality of stator magnetic poles and comprising an iron core having a plurality of projecting pole portions and a winding wound around each projecting pole portion of the iron core;

the iron core being constituted from a plurality of laminated steel plates;

a circuit substrate mounted with one or more electronic components constituting a control circuit for controlling current flowing through the windings;

the circuit substrate being fixed to the stator with a predetermined space provided between the projecting pole portions and the circuit substrate;

a rotor including a plurality of rotor magnetic poles, each of which is made of a permanent magnet, on an inner peripheral side thereof and including a plurality of blades on an outer peripheral side thereof;

a case comprising an inner cylindrical section, a plate-like section, and an outer cylindrical section;

the inner cylindrical section including bearing for rotatably supporting a rotary shaft of the rotor;

the plate-like section extending from an end of the inner cylindrical section in a direction perpendicular to a center line of the inner cylindrical section with a predetermined space provided between the circuit substrate and the plate-like section;

the outer cylindrical section extending from an outer end of the plate-like section in an axial line direction of the rotary shaft, along the inner cylindrical section; and a molded part formed with an insulating resin in such a manner that the stator, the one or more electronic components, and the circuit substrate are included therein;

wherein, in a portion of a surface of the molded part that faces the rotor, at least one concave portion is formed so as to be open toward the rotor and to receive expansion of the molded part in order to prevent contact of the molded part with the rotor when the molded part has expanded.

12. The watertight brushless fan motor according to claim 11, wherein the at least one concave portion comprises an annular groove formed so as to be adjacent to and run along the outer cylindrical section.

13. The watertight brushless fan motor according to claim 11, wherein the insulating resin for forming the molded part is made of an urethane resin.

14. The watertight brushless fan motor according to claim 12, wherein the insulating resin for forming the molded part is made of an urethane resin.

* * * * *